(12) United States Patent
Chomiak

(10) Patent No.: US 6,883,325 B2
(45) Date of Patent: Apr. 26, 2005

(54) METHOD OF UTILIZING WASTE HEAT IN TURBOCHARGER UNIT OF AN INTERNAL COMBUSTION ENGINE AND INTERNAL COMBUSTION ENGINE ARRANGEMENT

(75) Inventor: Jerzy Chomiak, Göteborg (SE)

(73) Assignee: Wartsila Technology Oy Ab, Helsinki (FI)

( * ) Notice: Subject to any disclaimer, the term of this patent is extended or adjusted under 35 U.S.C. 154(b) by 110 days.

(21) Appl. No.: 10/239,117

(22) PCT Filed: Apr. 10, 2001

(86) PCT No.: PCT/FI01/00356

§ 371 (c)(1),
(2), (4) Date: Nov. 26, 2002

(87) PCT Pub. No.: WO01/77504

PCT Pub. Date: Oct. 18, 2001

(65) Prior Publication Data

US 2004/0016234 A1 Jan. 29, 2004

(30) Foreign Application Priority Data

Apr. 10, 2000 (SE) .......................... 0001313-6

(51) Int. Cl.⁷ .............................................. F02B 37/00
(52) U.S. Cl. ......................... 60/618; 415/202; 415/184
(58) Field of Search .................... 60/618, 619, 608, 60/607; 415/202, 181, 184, 185, 186, 191

(56) References Cited

U.S. PATENT DOCUMENTS

| 3,137,477 | A | * | 6/1964 | Siegfried | 415/184 |
| 3,948,053 | A | * | 4/1976 | Gamell | 60/618 |
| 4,513,572 | A |   | 4/1985 | Bonnaud | |
| 4,684,321 | A | * | 8/1987 | Barrett et al. | 415/202 |
| 6,089,020 | A | * | 7/2000 | Kawamura | 60/618 |
| 6,119,457 | A | * | 9/2000 | Kawamura | 60/618 |

FOREIGN PATENT DOCUMENTS

| DE | 2630456 A | * | 1/1978 | F02B/73/00 |
| DE | 197 42 031 |   | 3/1999 | |
| EP | 1 028 233 |   | 8/2000 | |
| JP | 56066404 A | * | 6/1981 | F01D/1/06 |
| JP | 57171017 A | * | 10/1982 | 60/618 |
| JP | 58053607 |   | 6/1983 | |
| JP | 62007905 |   | 6/1987 | |
| JP | 06108865 A | * | 4/1994 | F02B/37/00 |
| JP | 06346745 A | * | 12/1994 | F02B/37/00 |
| JP | 11013547 A | * | 1/1999 | F02B/37/00 |
| SU | 1701956 |   | 12/1991 | |
| SU | 1728513 |   | 4/1992 | |

* cited by examiner

Primary Examiner—Thai-Ba Trieu
(74) Attorney, Agent, or Firm—Smith-Hill and Bedell

(57) ABSTRACT

Method of utilizing waste heat in a turbocharger unit of an internal combustion engine unit having means for recovering heat from the combustion process, the engine unit comprising a turbocharger unit adapted to feed pressurized combustion air to the engine and to receive exhaust gases from the engine, wherein the means for recovering heat is producing steam, which is generated using waste heat from the engine and wherein the steam is injected to the turbocharger unit and the energy of steam is at least partially recovered in the turbocharger. The invention relates also to an internal combustion engine arrangement which comprises means for recovering heat from the combustion process and a turbocharger unit adapted to feed pressurized combustion air to the engine and to receive exhaust gases from the engine. The turbocharger unit is provided with a steam injection arrangement connected with the means for recovering heat.

21 Claims, 3 Drawing Sheets

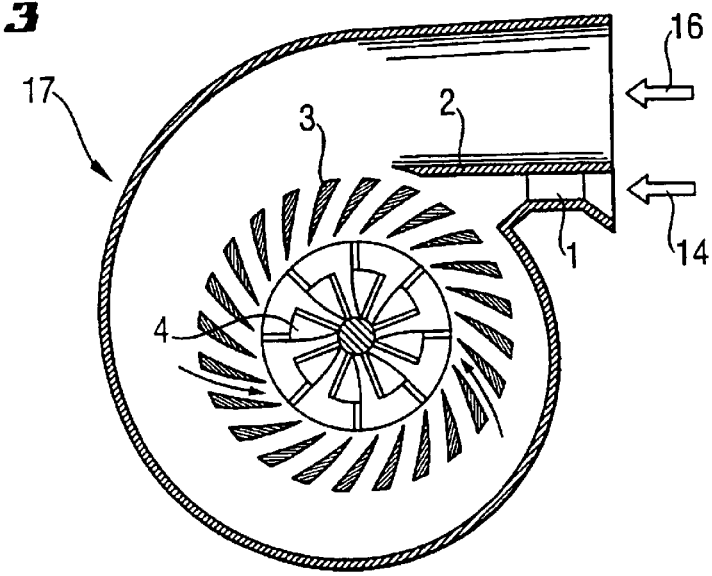
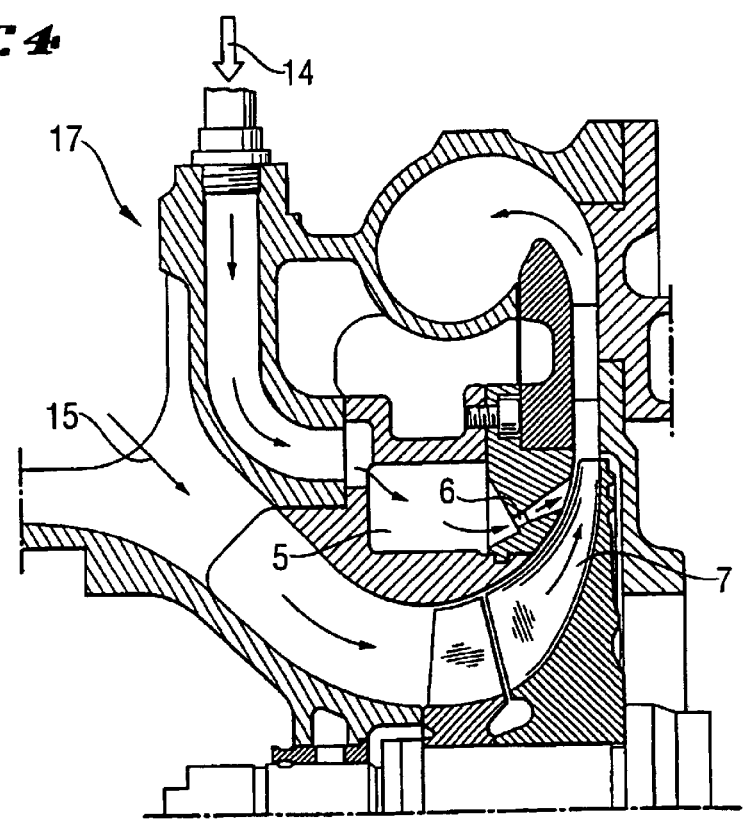

METHOD OF UTILIZING WASTE HEAT IN TURBOCHARGER UNIT OF AN INTERNAL COMBUSTION ENGINE AND INTERNAL COMBUSTION ENGINE ARRANGEMENT

This application is the national phase under 35 U.S.C. § 371 of PCT Internal Application No. PCT/FI01/00356, which has an internal filing date of Apr. 10, 2001, which is designated the United States of America.

TECHNICAL FIELD

The invention relates to method of utilising waste heat in turbocharger unit of an internal combustion engine unit having means for recovering heat from the combustion process, the engine unit comprising a turbocharger unit adapted to feed pressurised combustion air to the engine and to receive exhaust gases from the engine. The invention relates also to internal combustion engine comprising means for recovering heat from the combustion process, a turbocharger unit adapted to feed pressurised combustion air to the engine and to receive exhaust gases from the engine.

BACKGROUND ART

Different systems for utilisation of waste heat of an internal combustion engines are known. The most commonly used solution is a so called combined cycle, where the waste heat of internal combustion engine is utilised in a separate steam engine. An example of such a solution is provided for instance in publication U.S. Pat. No. 5,133,298. This kind of solution is a relatively expensive and somewhat difficult also, as internal combustion engines differ strongly in size and each size range requires a different steam engine.

In number of patents, for instance in U.S. Pat. No. 4,377,934, U.S. Pat. No. 4,406,127, U.S. Pat. No. 4,706,468 and U.S. Pat. No. 4,901,531, different versions of the bottom steam cycle are proposed, in which at least one cylinder of the internal combustion engine is used as the steam power recovery device, which in fact is a modification of the classic combined cycle engines. In U.S. Pat. No. 4,433,548 the alternating use of same cylinders for combustion and steam power strokes is described. Further, in U.S. Pat. No. 4,409,932 injection of the steam during the power stroke i.e. after combustion is proposed in a petrol car engine. A negative feature of all these solutions is that the emissions of the combined systems are the same as for the internal combustion (top) engine.

Many publications, for example U.S. Pat. No. 3,761,019, U.S. 4,014,299, U.S. Pat. No. 4,027,630, U.S. Pat. No. 4,059,078, U.S. Pat. No. 4,391,229, U.S. Pat. No. 4,409,931 and U.S. Pat. No. 4,844,028, describe steam injection into an inlet manifold of engines to control power, knock or NOx-emissions. However, these solutions using low grade steam and leaving the energy transformations out of considerations, do not necessarily provide increased efficiency.

Turbochargers as such are developed to achieve high conversion efficiency of the exhaust gas energy into the energy of compressed air used in the engine. Total energy conversion efficiencies of modern turbocharger approach 70%. Typically few turbocharger families are available to cover the possible engine applications and thus turbochargers able to accommodate more energy are readily available as such.

DISCLOSURE OF THE INVENTION

An object of the present invention is to provide a method in which the shortcomings of prior art solutions have been minimised. It is also an object of the present invention to provide a method of utilising waste heat in a turbocharger unit of an internal combustion engine unit. Particularly an object of the present invention is to achieve the maximum charging pressures in simple way in particular by using a modified turbocharger accommodating both steam and air.

According to the invention the method of utilising waste heat in turbocharger unit of an internal combustion comprises mainly as follows. The engine unit has means for recovering heat from the combustion process, and comprises a turbocharger unit adapted to feed pressurised combustion air to the engine and to receive exhaust gases from the engine. In the method the means for recovering heat is producing steam, which is generated using waste heat from the engine and the steam is injected to the turbocharger unit. The internal combustion engine arrangement comprises means for recovering heat from the combustion process, a turbocharger unit adapted to feed pressurised combustion air to the engine and to receive exhaust gases from the engine. The turbocharger unit is provided with steam injection arrangement connected with the means for recovering heat. Thus, the energy of steam is at least partially recovered in the turbocharger. This way it is possible to minimise NOx-emissions and enhance the power output of the engine.

According to an aspect of the invention the steam is injected into the high-pressure region of turbine of the turbocharger unit by means of the steam injection arrangement provided in the high-pressure region of turbine of the turbocharger unit. This manner mixing of steam with the exhaust gases is minimised and the steam energy is recovered in the turbine.

According to another aspect of the invention the steam is injected into the compressor or the turbocharger though a steam injection arrangement provided in the compressor of the turbocharger. The steam is preferably injected to the tip-section of the impeller of the compressor through a number of nozzles so that a considerable portion of the steam energy is used to drive the impeller. Preferably a supersonic nozzle is used for the steam injection. The steam may also be injected tangentially into inlet of the compressor close to the impeller so that mixing of steam with the air is minimised before the impeller, and causing steam layer to rotate and to drive the impeller. It is also possible, and in some cases even desirable, to have the steam injected simultaneously into both the high-pressure region of the turbine and into the compressor of the turbo-charger, whereas both the compressor and turbine of the turbocharger unit are provided with steam injection arrangement.

The steam injection rate is preferably controlled by a closed loop control system, which controls the injection rate so as to keep the temperature of the exhaust gases at a pre-set level. The steam rate may also be controlled so that transient operation of turbocharger is enhanced.

According to the invention the fact that there are commercially available turbochargers to cover possible engine applications is taken into consideration. Modifying an existing turbocharger to utilise efficiently the energy of steam generated using the waste heat of the engine is a preferred starting point of the invention. Both the inlet air heat and engine cooling heat as well as the exhaust heat may be advantageously used to generate the steam. Taking into account the energy balance of the engine, this means that a quantity of water approximately 3–4 times the quantity of fuel used by the engine can be converted into high grade superheated steam having pressure up to 220 bar and temperatures up to 850 K. Preferably the mass of the steam is between 10 to 20% of the mass of the air depending on the fuel/air equivalence ratio of the engine and thus no radical changes in the turbocharger are needed to utilise the steam energy.

The injection into the turbine is optimal for one aspect of the invention, which is to provide means to increase the power output and efficiency of the engine. The injection of the steam into the compressor provides, in addition to increasing the pressure, means to substantially reduce the nitrogen oxide emissions. An additional benefit of the invention is also that the steam injection may be used to reduce possible turbocharger lag during transient operation of the engine and to control the charging pressure in order to obtain a favourable torque curve of the engine.

BRIEF DESCRIPTION OF THE DRAWINGS

A full understanding of the present invention may be gained by reference to the following detailed description when read in conjunction with the accompanying drawings, wherein:

FIG. 3 is a schematic drawing of a system based on steam injection into the turbine of the turbocharger.

FIG. 4 is a schematic drawing of a system based on steam injection at the tip of the impeller of the compressor of the turbocharger.

BEST MODE FOR CARRYING OUT THE INVENTION

Figure 1:
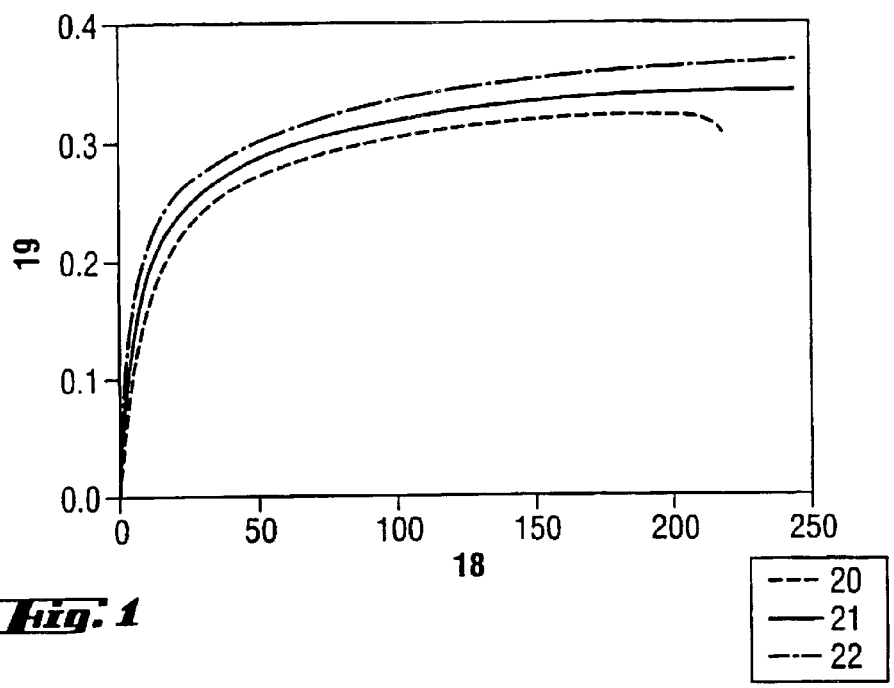
FIG. 1 shows the maximum conversion efficiency of waste heat of an ideal cycle into steam energy available for utilisation as a function of pressure for different temperatures.

Typically 30–40% of the fuel energy leaves an internal combustion engine in form of recoverable waste heat. The waste heat to be converted into mechanical energy must go through a thermodynamic cycle. If steam is used as the working fluid for that cycle then the maximum possible efficiency is achieved in an ideal Clausius-Rankine cycle, which is presented in FIG. 1. The efficiency of this cycle is shown in vertical axis 19 of FIG. 1 as a function of pressure, which is shown in horizontal axis 18. The presentation is assuming surrounding pressure of 1 bar, and showing three temperatures 500° C., curve 22, 400° C., curve 21, and saturated vapour temperature for the respective pressure, curve 20, which is the lowest possible temperature for proper functioning of steam engine. The saturation temperature changes approximately linearly from 100° C. at 1 bar to 374.15° C. at 220.8 bar, which is the critical point. As it can be seen from FIG. 1 high pressures and temperatures offer the best efficiency. The efficiency drops rapidly with pressure below 50 bar, which is thus the lowest pressure for practical application of steam cycle.

According to the invention a turbocharger of an engine is utilised as will be described below. This is possible because it has been noticed that the mass of the steam needed is typically substantially below 20% of the mass of air and thus it can be accommodated by the turbocharger or a slightly larger member of the turbocharger family used for the engine.

Figure 2:
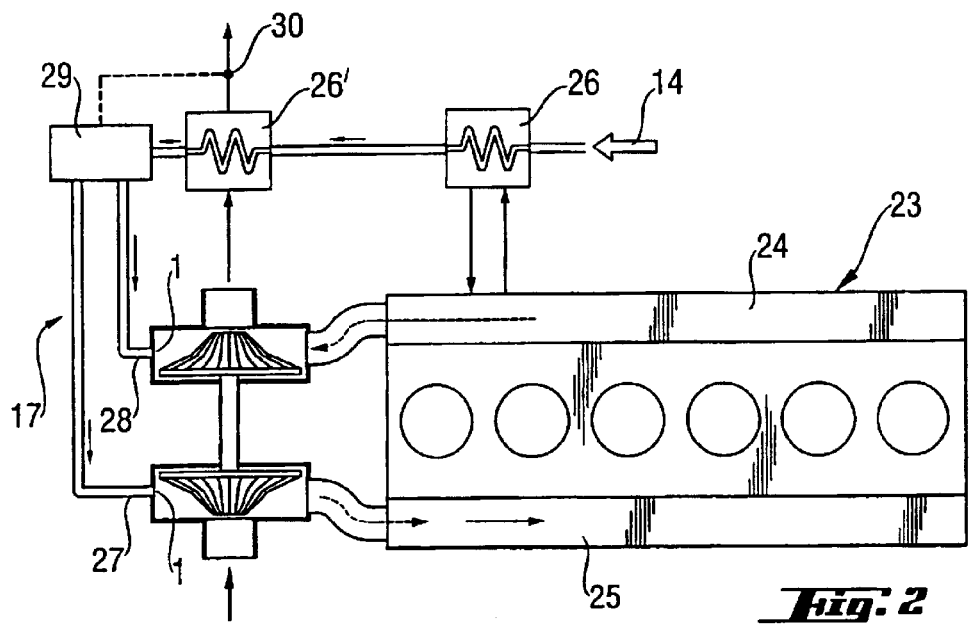
FIG. 2 is a schematic illustration of an internal combustion system with turbocharger unit according to the invention.

In FIG. 2 there is schematically shown an internal combustion system with turbocharger unit according to the invention. The internal combustion system comprises a combustion engine 23, which is here a reciprocating combustion engine. It is provided with an inlet manifold 25 for combustion air and outlet manifold 24 for exhaust gases being connected to the turbocharger unit 17. Steam 14 is produced by a steam generator 26,26' utilising the waste heat of the engine. This may be originating e.g. from cylinder cooling using the steam generator 26 and/or from hot exhaust gases using the steam generator 26' and/or inlet air cooling (not shown). The steam is fed by means of a control unit 29 into the compressor and/or turbine of the turbocharger by supply lines 27,28. The total steam injection rate is controlled by preferably maintaining the temperature of the exhaust gases at pre-selected level, which is advantageously below dew point temperature. In order to provide continuous control over the steam injection the exhaust gas temperature is measured by probe 30 shown in FIG. 2. Since the temperature of the exhaust gases is an easily measurable quantity a closed loop control unit 29 of steam injection rate control system based on exhaust temperature is advantageously applied in the system.

Efficient utilisation of the steam energy requires minimisation of the steam-gas mixing losses. This in turn may be accomplished by injection of the steam into a high pressure, high velocity zone of the turbocharger and extracting energy from the high velocity steam jet to slow it down as much as possible before mixing with the rest of the gas. This is achieved according to the present invention by arrangement shown in FIG. 3. The steam 14 is here injected into the high-pressure part of the turbine through a supersonic De Laval nozzle 1 parallel to the exhaust gas 16. The injection is performed in such a way that mixing is minimised. This may be accomplished by the splitter plate 2 provided in connection with the turbine inlet. Thus the steam energy is efficiently utilised due to further expansion in the turbine nozzle 3 and impeller 4. More energy is thus transferred to the shaft of the turbocharger and higher pressure is available in the inlet manifold of the engine.

The higher pressure in turn is utilised during the intake stroke of the engine to produce shaft power. An estimate of the losses shows that about 50% of the available steam energy can be utilised using the above method.

Utilisation of the steam for dilution of the charge to reduce NOx emissions requires injection of the steam into the inlet of the engine. This can be achieved with minimal energy losses according to the invention by injecting the steam into the high-pressure part of the compressor so that the steam will drive the impeller. This will reduce the speed of the steam jet and increase the air pressure. The optimal solution for this case is shown schematically in FIG. 4. Steam 14 is collected here in a collector chamber 5 and is distributed to several small supersonic nozzles 6. The steam jets formed are thus driving the impeller 7 of the compressor. Several nozzles are used in this case to minimise the flow perturbations in the compressor and the non-stationary aerodynamic forces on the blades of the impeller. The number and inclination angles of the nozzles may be optimised experimentally to obtain the best effects for each respective case. About 40% of the compressed air energy could be recovered in this kind of systems.

Figure 5:
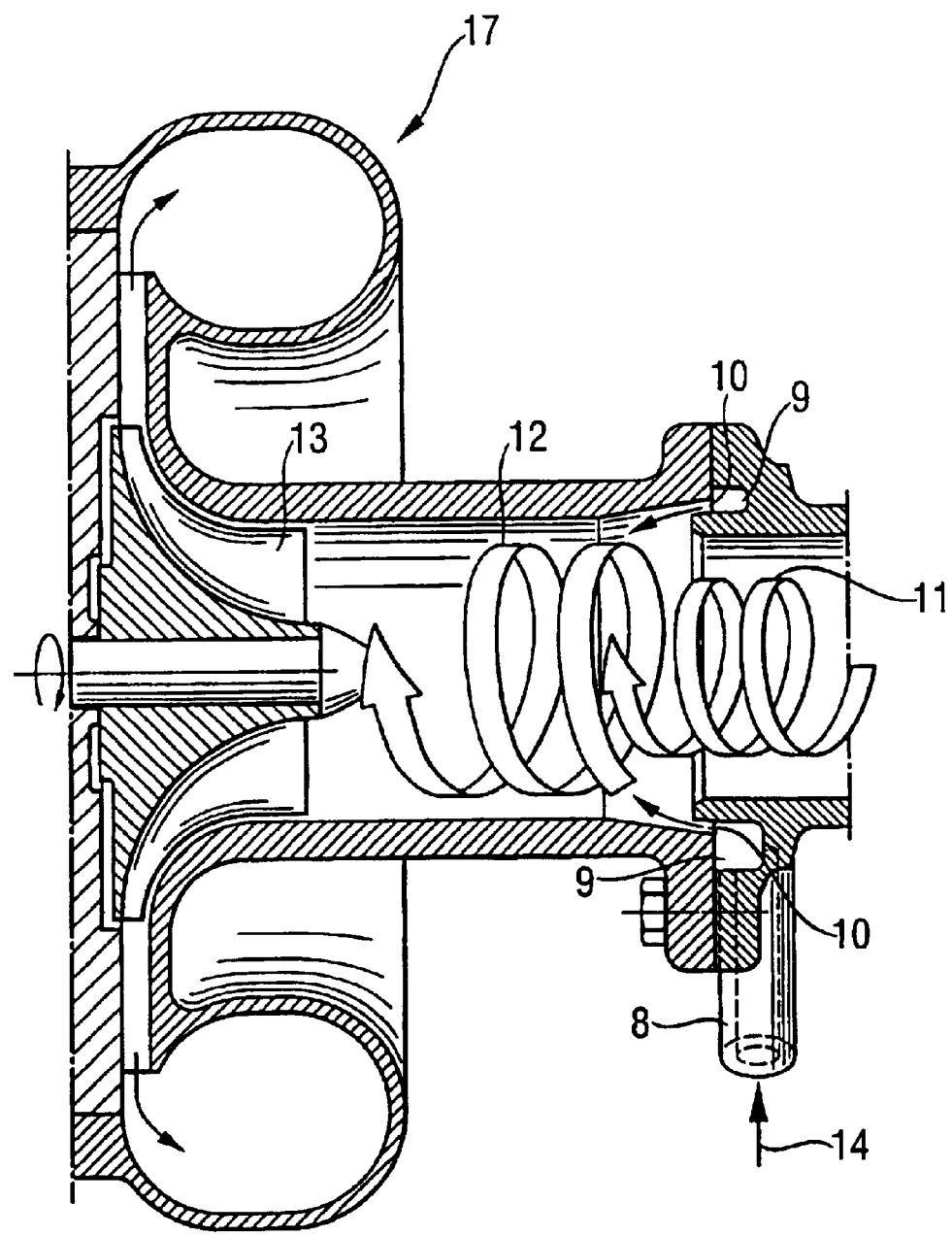
FIG. 5 is a schematic representation of the steam injection at the inlet to the compressor of the turbocharger.

Another system is shown in FIG. 5. The steam is introduced tangentially through the tube 8 into a steam scroll 9 and injected through the nozzle 10 into the inlet of the compressor forming a wall jet 12. This minimises the mixing of the steam with the incoming air 11. The rapidly rotating steam layer drives the impeller 13 and thus the steam energy is recovered, and the speed of steam reduced. While being simpler, this embodiment may not be as efficient as the one shown in FIG. 4.

As much as possible of the waste heat of the engine should be recovered in the steam system for best efficiency. However, at the same time the temperature of the exhaust gases must be higher than a minimal value to avoid condensation in the outlet system and related corrosion. This is particularly important where high sulphur contents fuel is used in the engine and, also to provide buoyancy for better dispersion of the exhaust gases in the atmosphere. Therefore, the injection rate of the steam shall be limited by the exhaust gas dew point temperature.

While specific embodiments of the invention and descriptions of its utilisation to raise the power and efficiency of the engine and reduce pollutant emissions are described herein, it shall be understood by those skilled in the art, that other embodiments and alternatives could be employed in light of the overall teaching of the disclosure. In particular a combination of the steam injection methods may be advantageously employed. The invention is thus not limited to the embodiments and numerical values shown but several modifications of the invention are reasonable within the scope of the attached claims.

What is claimed is:

1. A method of operating an internal combustion engine unit that comprises a turbocharger unit which feeds pressurized combustion air to the engine and receives exhaust gases from the engine, and a steam generator for generating steam by recovering heat from the combustion process, said method comprising:

using the steam generator to generate steam by recovering waste heat from the engine, and injecting steam generated by the steam generator into a compressor of the turbocharger unit via a steam injection arrangement provided in the turbocharger unit.

2. A method according to claim 1, wherein the compressor has an impeller with a tip section and the method comprises injecting the steam at the tip section of the impeller through a plurality of nozzles so that a considerable portion of the steam energy is used to drive the impeller.

3. A method according to claim 1, wherein the compressor includes an impeller and has an inlet for admitting air to the compressor and the method comprises injecting the steam tangentially into the inlet of the compressor close to the impeller so that mixing of steam with the air upstream of the impeller is minimized and the steam forms a layer that rotates and drives the impeller.

4. A method according to claim 1, comprising injecting the steam into the turbocharger through a supersonic nozzle.

5. A method according to claim 1, comprising injecting steam generated by the steam generator into the turbocharger unit at a high pressure region of a turbine of the turbocharger unit via a steam injection arrangement provided in the turbocharger unit.

6. A method according to claim 1, comprising controlling the rate of injection of steam by a closed loop control system that keeps the exhaust gases at a pre-set temperature level.

7. A method according to claim 1, wherein the mass of the steam is between 10 to 20% of the mass of combustion air.

8. A method according to claim 1, wherein the energy of steam is at least partially recovered in the turbocharger.

9. A method of operating an internal combustion engine unit that comprises a turbocharger unit which feeds pressurized combustion air to the engine and receives exhaust gases from the engine, and a steam generator for generating steam by recovering heat from the combustion process, said method comprising:

using the steam generator to generate steam by recovering waste heat from the engine, and injecting steam generated by the steam generator into the turbocharger unit at a high pressure region of a turbine of the turbocharger unit via a steam injection arrangement provided in the turbocharger unit so that mixing of steam with the exhaust gases is minimized and steam energy is recovered in the turbine.

10. A method according to claim 9, comprising injecting the steam into the turbocharger through a supersonic nozzle.

11. A method according to claim 9, comprising controlling the rate of injection of steam by a closed loop control system that keeps the exhaust gases at a pre-set temperature level.

12. A method according to claim 9, wherein the mass of the steam is between 10 to 20% of the mass of combustion air.

13. A method according to claim 9, wherein the energy of steam is at least partially recovered in the turbocharger.

14. A method of operating an internal combustion engine unit that comprises a turbocharger unit which feeds pressurized combustion air to the engine and receives exhaust gases from the engine, and a steam generator for generating steam by recovering heat from the combustion process, said method comprising:

using the steam generator to generate steam by recovering waste heat from the engine, injecting steam generated by the steam generator into the turbocharger unit via a steam injection arrangement provided in the turbocharger unit, and controlling the rate of injection of steam by a closed loop control system that keeps the exhaust gases at a pre-set temperature level.

15. A method according to claim 14, comprising injecting the steam into the turbocharger through a supersonic nozzle.

16. A method according to claim 14, wherein the mass of the steam is between 10 to 20% of the mass of combustion air.

17. A method according to claim 14, wherein the energy of steam is at least partially recovered in the turbocharger.

18. A method according to claim 14, comprising injecting steam into both a high pressure region of a turbine of the turbocharger unit and into a compressor of the turbocharger unit.

19. An internal combustion engine comprising:

a steam generator for recovering heat from the combustion process, a turbocharger unit adapted to feed pressurised combustion air to the engine, the turbocharger unit including a turbine for receiving exhaust gases from the engine and having a high-pressure region, and a steam injection arrangement connected with the steam generator, wherein the steam injection arrangement is provided in the high-pressure region of the turbine of the turbocharger unit.

20. An internal combustion engine according to claim 19, wherein the turbocharger unit includes a compressor and the engine further comprises a steam injection arrangement connected with the steam generator and provided in the compressor of the turbocharger unit.

21. An internal combustion engine comprising:

a steam generator for recovering heat from the combustion process, a turbocharger unit adapted to feed pressurised combustion air to the engine and to receive exhaust gases from the engine, the turbocharger unit including a compressor, and a steam injection arrangement connected with the steam generator, wherein the steam injection arrangement is provided in the compressor of the turbocharger unit.

* * * * *